United States Patent [19]

Waugh

[11] 4,446,179

[45] May 1, 1984

[54] TRIM STRIP FOR AUTOMOBILE BODIES

[75] Inventor: Robert E. Waugh, Columbus, Ohio

[73] Assignee: The D. L. Auld Company, Columbus, Ohio

[21] Appl. No.: 468,721

[22] Filed: Feb. 28, 1983

Related U.S. Application Data

[63] Continuation-in-part of Ser. No. 380,783, May 21, 1982, abandoned.

[51] Int. Cl.$^3$ .............................................. B60R 13/04
[52] U.S. Cl. ....................................... 428/31; 52/716; 293/128; 428/67
[58] Field of Search ............... 428/31, 67, 187; 293/1, 293/128; 52/716

[56] References Cited

U.S. PATENT DOCUMENTS

| | | | |
|---|---|---|---|
| 3,046,174 | 7/1962 | Brooks et al. | 428/31 X |
| 3,434,903 | 3/1969 | Hann | 428/40 X |
| 3,843,475 | 10/1974 | Kent | 428/31 X |
| 3,881,042 | 4/1975 | Ungerer | 428/31 X |
| 3,914,482 | 10/1975 | Sawa et al. | 428/31 |
| 3,959,538 | 5/1976 | Loew | 428/31 |
| 3,982,780 | 9/1976 | Keith | 428/31 X |
| 4,010,297 | 3/1977 | Wenrick | 428/31 |
| 4,100,010 | 7/1978 | Waugh | 428/42 X |
| 4,220,681 | 9/1980 | Narita | 428/31 |
| 4,260,655 | 4/1981 | Zoller | 428/31 |
| 4,275,099 | 6/1981 | Dani | 428/31 |
| 4,292,827 | 10/1981 | Waugh | 428/913.3 X |
| 4,296,155 | 10/1981 | Madonia et al. | 428/31 |
| 4,356,617 | 11/1982 | Coscia | 428/913.3 X |

Primary Examiner—Henry F. Epstein
Attorney, Agent, or Firm—Biebel, French & Nauman

[57] ABSTRACT

An elongate trim strip comprising an elongate moulding, said moulding having a flat surface for receiving adhesive or otherwise attaching the strip to the body of a vehicle, a longitudinal channel formed in said moulding, a decorative surface in said channel and a weather-resistant and impact-resistant plastic overlay having radiused edges which provides a lens effect to the decorative surface beneath. Also a trim strip consisting essentially of an elongate decorative foil member having an upper surface and a lower surface and sharply defined peripheral edges, said upper surface having thereon a weather-resistant and impact-resistant overlay having radiused edges and providing a lens effect to said foil member, said overlay being formed by overcoating said upper surface of said foil member with a fluent clear plastic material which flows to said sharply defined peripheral edges and forms a positive meniscus and curing said plastic material.

12 Claims, 3 Drawing Figures

TRIM STRIP FOR AUTOMOBILE BODIES

Cross Reference to Related Applications

This is a continuation-in-part of application Ser. No. 380,783 filed May 21, 1982 and now abandoned.

BACKGROUND OF THE INVENTION

The present invention relates to an elongate strip or moulding of the type attached to an automobile body side or other motor vehicles for protection or decoration.

Trim strips of various configurations have been used in the automotive industry to decorate and protect the surfaces of an automboile, especially the body side surfaces. In recent years, emphasis has been placed on replacing chromed metallic moulding strips with improved plastic trim strips which do not corrode and can be adhesively attached to the automobile body without fasteners. There are a number of examples of such trim strips in the patent literature.

Madonia, U.S. Pat. No. 4,206,155 (1981) discloses a decorative body side moulding in which a decorative strip is laminated to an extruded strip of a pliable material and the two strips are overcoated with a weather resistant coating of acrylic monomer.

Narita, U.S. Pat. No. 4,220,681 (1980) teaches a trim in which a thin metal layer is laminated to a plastic substrate and coated with a soft PVC resin provided with a matt surface.

Wenrick, U.S. Pat. No. 4,010,297 (1977) discloses a composite trim strip made up of two adhesively bonded non-coextensive longitudinal body portions, one body portion being wider than and adapted to receive the other body portion. The body portions are assembled and attached to the side of an automobile using elastomeric adhesives which serve to distribute impact.

Sawa et al, U.S. Pat. No. 3,914,482 (1975) illustrates a moulding wherein a reflective layer is deposited on a rigid synthetic resin base which is coated with a clear synthetic resin layer and overcoated with a protective layer of synthetic resin of uniform thickness.

Kent, U.S. Pat. No. 3,843,425 (1974) relates to a decorative trim having a longitudinal passage therethrough which is filled or coated with a decorative material such as a paint. The trim is formed with a shallow channel on its underlying surface which carries adhesive.

SUMMARY OF THE INVENTION

It is the principal object of the present invention to provide a trim strip for use on motor vehicles which is readily manufacturable on a continuous basis and which provides enhanced decorative effects which can be varied without altering the basic manufacture of the trim. For example by changing the decorative surface the trim can be modified to complement the color or style of a number of vehicles without otherwise affecting the manufacturing operations.

Another object of the present invention is to provide a trim strip which is decorative, weather-resistant and which can absorb impacts.

Still another object of the present invention is a decorative trim strip which provides a lens effect which enhances the appearance of the trim.

The above and other objects are attained in accordance with the present invention which provides a trim strip for vehicle bodies comprising an elongate moulding having a flat underlying surface for receiving adhesive or otherwise attaching the trim strip to a vehicle, an elongate channel formed longitudinally in the moulding of the strip, a decorative surface in the channel, and a deposit of cast plastic which overcoats the foil member and when cured provides an impact-resistant and weather-resistant cap having radiused edges which provides a lens effect to the decorative surface beneath. When viewed through the cast/cured plastic, the decorative surface is optically modified to enhance the appearance of the decoration. The backside of the moulding may be coated with an adhesive for attaching the strip to the vehicle body.

The elongate moulding portion of the trim strip is preferably formed from an extrudable plastic material which hardens to an impact resistant base. The trim strip can thus be manufactured by a process which comprises extruding the moulding, painting a decoration or laying a decorative foil member to form a decorative surface, in a channel extrusion-formed in the moulding and thereafter casting plastic into the channel which thereby forms a positive meniscus and hardens to a tough, weather-resistant, and impact-resistant cap having radiused edges. The plastic cap is preferably formed from a clear plastic material. The curvature of the edges provides a lens effect which optically enhances the appearance of the decorative surface viewed through the plastic cap. A preferred plastic is a polyurethane having high impact resistance and more preferably a flexible polyurethane which cures to a Shore D hardness of about 45 to 65.

In another embodiment of the invention, the trim strip is manufactured without a moulding and consists essentially of an elongate decorative foil member having an upper surface and a lower surface and sharply defined peripheral edges, said upper surface having thereon a weather-resistant and impact-resistant overlay having radiused edges and providing a lens effect to said foil member, said overlay being formed by overcoating said upper surface of said foil member with a fluent clear plastic material which flows to said sharply defined peripheral edges and forms a positive meniscus and curing said plastic material, and preferably a layer of a pressure-sensitive adhesive on the lower surface of said foil member for securing said trim strip to a body surface. Again, the preferred plastic cap is an abrasion-resistant, weather-resistant polyurethane having a Shore D of about 45 to 65 and more preferably 45 to 55.

DESCRIPTION OF A PREFERRED EMBODIMENT

Figure 1:
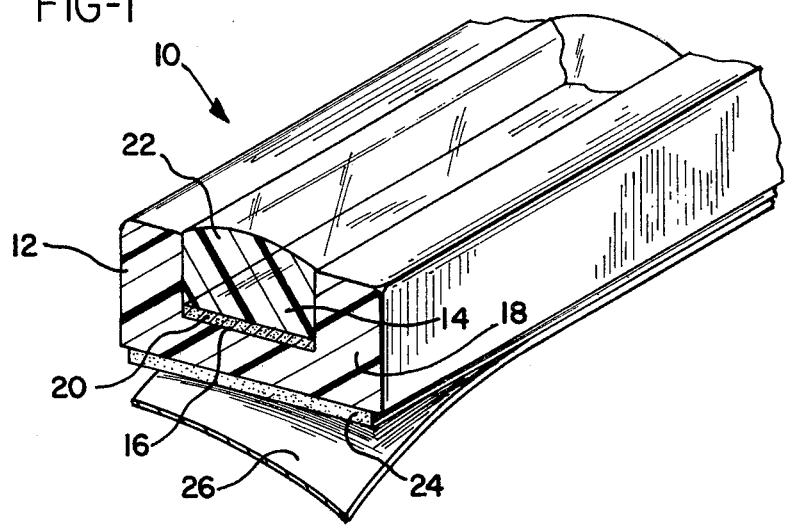
FIG. 1 is a perspective view and lateral cross-section of a trim strip for a motor vehicle body in accordance with the present invention.

With reference to FIG. 1, the trim strip of the present invention is generally indicated by the reference numeral 10. The trim strip 10 comprises an elongate moulding 12 which is preferably a heat and impact resistant plastic such as acrylonitril-butadiene-styrene terpolymer (ABS), polyvinyl chloride (PVC), nylon (polyamide), polycarbonate, acrylonitril-styrene copolymer, etc. Of these, PVC is most often used as the body portion.

Moulding 12 is preferably formed by extrusion of one of the aforesaid plastics with a channel 14 extrusion formed therein, but other processes such as injection molding may also be used to form an elongate body portion having a channel therein. In FIG. 1, the channel is shown as having a rectangular cross-section, but other cross-sections can be used to provide different optical effects. Channel 14 comprises a floor 16 and side walls or shoulders 18 for retaining cast plastic as described later.

A decorative surface 20, which may be a decorative foil member, is located in the channel 14. The term "foil member" as used herein includes metal foils, plastic foils (e.g. Mylar), metallized plastic foils and paper-backed foils. The foil member may take various forms, for example, it may be a strip of metal foil which may be embossed to provide a visual effect. Otherwise, the foil member may be a plastic foil strip which is printed or silk-screened with a decorative design, painted or tinted. An adhesive may be used to bond the foil member to the floor 16 of channel 14 when it is very thin and does not readily lie flat.

Alternatively, decorative surface 20 may be a painted layer or silk screen printing layer or a decorative material otherwise deposited directly onto the floor 16 of channel 14. The decorative surface may thus be a solid color, a variety of colors or colored designs, or may contain graphics along with or in place of the color or colors used.

The depth and width of the channel 14 are not particularly critical, although, the optical effect created by the cap varies with the size, shape and dimensions of the channel when the trim is manufactured by casting plastic directly into the channel. Thus, the channel design can be coordinated with the style of inlay to produce the desired decorative effect. The decorative surface 20 is overcoated with a deposit of cast plastic 22. The cast plastic 22 is such that it forms a positive meniscus in channel 14 which provides a trim having radiused edges which provides a lens effect for example by enhancing the decorative surface 20 when viewed from above or at an angle to the trim strip 10.

For use as automobile side body trim, the cast plastic is preferably a thermosetting material which is weather-resistant and does not yellow or cloud as a result of prolonged exposure to sunlight and which withstands strong detergents. The cast plastic should also be resistant to abrasion and impact. A number of plastics can be used for this purpose, but one which is particularly advantageous because it satisfies all the above needs is an impact-resistant polyurethane. One polyurethane useful in the present invention is the reaction product of polypropylene glycol and an aliphatic diisocyanate. Other plastics, such as acrylics and and epoxies may also be used. In one embodiment, a relatively soft, flexible, weather-resistant polyurethane generally characterized by a Shore D hardness in the range of 45 to 65 and preferably 45 to 55 is used. Such materials are known and various ones can be used in the invention. One that is particularly useful is the reaction product of (A) a mixture of a polyester glycol and low to medium molecular weight polypropylenetriols and (B) an aliphatic diisocyanate-polypropylenetriol adduct.

The plastic composition 22 is cured or otherwise hardened to form the overlay. The plastic composition is preferably cured by heating or ultraviolet radiation, however, depending on the plastic used other means such as R. F. heating and air drying may be used to harden the cap.

The trim strip 10 may be secured to a vehicle body, such as the side body of an automobile with an adhesive composition 24 on the base of the strip. Prior to installation the adhesive is protected with a release paper or film 26 such as wax paper or silicone release paper. Various adhesives can be used, in the present invention. Preferred adhesives are pressure sensitive adhesives.

Alternatively the trim strip 10 may be secured to a vehicle body by other attachment means (not shown) such as clips which are attached to the vehicle body or use of studs which are pressure fit into openings in the vehicle body. Other attachment means are also known in the industry.

The trim strip shown in FIG. 1 is typically manufactured by extrusion molding the moulding 12, painting a decoration or laying a decorative foil member to form a decorative surface in the channel formed in the moulding and casting and thereafter hardening the plastic deposit. The decorative surface is retained in the channel by the cast plastic which contacts the side walls of the channel and thereby encapsulates the foil member. When a very thin foil member is used as the decorative surface, an adhesive may be necessary on the back of the foil to hold the foil in a flat condition in the channel during casting.

In the case of a polyurethane plastic material, the reactive components (i.e., the polyol component and the diisocyanate component) are typically mixed at a mixing head and the mixture is cast into the channel as it reacts. Thereafter, the cast plastic is hardened. Depending on the nature of the plastic composition forming the cap, hardening may occur upon heating or irradiation, for example, with ultraviolet radiation. In the preferred case, these procedures are carried out on a continuous basis wherein the body portion is extruded and downstream after the body portion has set, the decorative surface is placed in the channel and the plastic is cast and cured.

The underlying surface of moulding 12 may be coated with adhesive and a release paper or film applied before or after the foil member is positioned and the plastic is cast into place. The adhesive may be coated directly on the trim strip or coated on the release paper which is thereafter applied to the trim strip.

Figure 2:
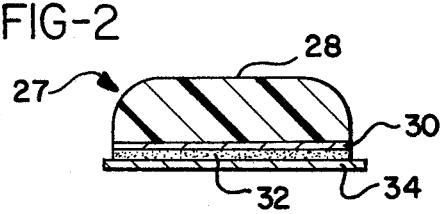
FIG. 2 is a lateral cross-sectional view of a trim strip in accordance with another embodiment of the invention.

FIG. 2 illustrates a further embodiment of the invention wherein the trim strip is formed without an extrudable plastic moulding as in FIG. 1. As shown in FIG. 2, in accordance with one embodiment of the invention, trim strip 27 consists essentially of a decorated and usually embossed foil member 30 which carries on the decorated or graphic surface thereof a clear, plastic overlay 28 having radiused edges. The trim strip in accordance with this embodiment is usually equipped with a layer of adhesive 32 (generally pressure-sensitive) which is accessed by removing a release liner 34. Trim strip as shown in FIG. 2 can be manufactured by pre-printing and embossing an adhesive backed foil member provided with a release liner which is kiss-cut in registry with the printed design. By removing the selvage from around the trim and casting a fluid plastic such as polyurethane on the trim strip, an overlay having radiused edges which provides a lens effect is obtained as the plastic flows to the cut edge of the foil member, stops and forms a positive meniscus. Thereafter, the overlay is cured. It is particularly advantageous to form the overlay 28 in FIG. 2 of a soft, flexible polyurethane as the trim can be rolled up and supplied directly to the automobile owner as part of a customizing kit. With the flexible overlay, the trim strip conforms to the curvature of the automobile body.

Figure 3:
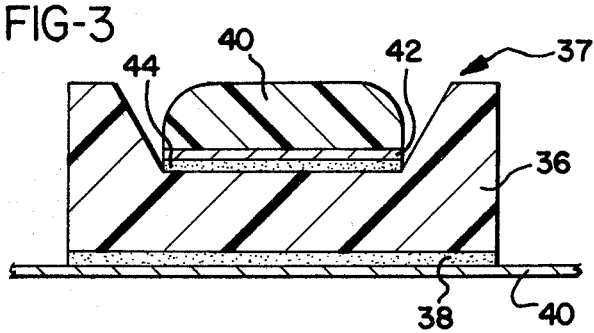
FIG. 3 is a lateral cross-sectional view of still another embodiment of the invention.

The trim strip shown in FIG. 3 comprises an extrudable elongate moulding 36, a printed and usually embossed foil member 42, and an overlay 40 having radiused edges. The inlay (comprising the overlay 40 and the foil member 42) is secured within moulding 36 by an adhesive layer 44. The trim strip 37 is secured to the vehicle body by adhesive layer 38 which is protected with liner 40 which is removed at the time of installation. In contrast to the embodiments of FIG. 1, trim strip 37 is not necessarily manufactured by casting plastic onto the inlay in the elongate moulding but can be formed by preparing a pre-cast trim strip as in FIG. 2 and laying this strip (minus release liner 34) into the channel in moulding 36 where it is adhered with the adhesive 44. It will be evident from this embodiment of the invention that it is not necessary for the plastic overlay-forming material to be cast into place and contact the side walls of the channel in the body moulding.

While the invention has been described in detail and by reference to specific embodiments thereof, it will be apparent that numerous modifications and variations are possible without departing from the scope of the appended claims.

What is claimed is:

1. A trim strip comprising:
   an elongate moulding, said moulding having a lower surface for receiving adhesive or otherwise attaching said trim strip to the body of a vehicle,
   an elongate channel formed in the upper surface of said moulding having a floor and two side walls or shoulders,
   an elongate decorative surface in said channel, and
   a weather-resistant and impact-resistant clear plastic cap cast over said decorative surface and having radiused edges providing a lens effect to said decorative surface beneath and thereby optically enhancing the appearance of said decorative surface as viewed through said clear plastic cap.

2. The trim strip of claim 1 wherein said clear plastic cap is an abrasion-resistant polyurethane.

3. The trim strip of claim 2 wherein said clear plastic cap is flexible.

4. The trim strip of claim 3 wherein said decorative surface is a foil member selected from the group consisting of metal foil, plastic foil, or metallized plastic foil.

5. The trim strip of claim 1 wherein said channel has a rectangular cross section.

6. The trim strip of claim 1 wherein said clear plastic cap is formed by casting a fluent plastic material into said channel to form a positive meniscus which when hardened provides said lens effect, said channel having a decorative foil member retained therein as said decorative surface.

7. The trim strip of claim 6 wherein said plastic substantially fills said channel.

8. A trim strip consisting essentially of an elongate decorative foil member having an upper surface and a lower surface and sharply defined peripheral edges and a weather-resistant clear plastic cap, formed by overcoating said upper surface of said foil member with a fluent clear plastic material which flows to said sharply defined peripheral edges and forms a positive meniscus and curing said plastic material to provide a lens effect to said decorative foil member and thereby optically enhance the appearance of said upper surface of said decorative foil member as viewed through said clear plastic cap.

9. The trim strip of claim 8 wherein said foil member has a layer of adhesive on said lower surface for securing said trim strip to a body surface.

10. The trim strip of claim 9 wherein said clear plastic cap is an abrasion-resistant polyurethane.

11. The trim strip of claim 10 wherein said clear plastic cap is a flexible, abrasion-resistant polyurethane.

12. The trim strip of claim 11 wherein said foil member is metal foil, plastic foil, or metallized plastic foil.

* * * * *